3,085,043
METHODS AND COMPOSITIONS FOR THE TREATMENT OF SOIL
David J. Beaver, Richmond Heights, Ernest G. Jaworski, Olivette, and Albert J. Suhovecky, Florissant, Mo., assignors to Monsanto Chemical Company, St. Louis, Mo., a corporation of Delaware
No Drawing. Filed Oct. 26, 1961, Ser. No. 147,748
18 Claims. (Cl. 167—22)

This invention pertains to methods of treating soil and to novel compositions of matter suitable therefor. More particularly, the invention pertains to methods for the treatment of agricultural soils inhabited by phytogenic soil-borne organisms, such as fungi, nematodes and bacteria, in order to protect plants against attacks by these pathogens. Economical and practical compositions of matter adapted to this purpose also form an aspect of the invention.

The problems involved in controlling these phytopathogenic organisms are rather complex, since an effective toxicant must be active with respect to a broad spectrum of objectionable organisms, and it must also have the ability to penetrate the organism and interfere with its life processes. In addition, an effective compound must have the ability to permeate the soil and contact the objectionable organism and yet resist the attack of soil bacteria which decompose most foreign substances and render them harmless. An effective compound must be sufficiently persistent to accomplish its desired purpose and yet it must also dissipate in a reasonable period of time so that sensitive crops may be planted in the treated soil. For these reasons it is impossible to predict the biological activity of a compound by a visual inspection of the structural formula of the compound.

An object of this invention is to provide a novel method of controlling phytopathogenic soil-borne organisms which interfer with growth and development of crops in agricultural soils. A further object is to provide an effective composition for minimizing the population of parasitic worm life and fungi in agricultural soils. Other objects will become apparent from the following description of the invention.

In accordance with this invention it has been found that the compounds represented by the following formula possess unusual and valuable soil biocidal activity:

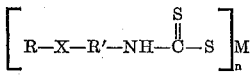

wherein X is an oxygen or a sulfur atom; R' is an alkylene radical having from two to six carbon atoms such as dimethylene, trimethylene, tetramethylene, etc., R is an aliphatic radical having up to nine carbon atoms and includes alkyl, alkenyl, alkynyl and alkoxyalkyl radicals having up to nine carbon atoms; M is a salt forming element and includes alkali metals, e.g. Na, K, Li, etc., alkaline earth metals, e.g. Ca, Ba, Mg, Sr, etc.; heavy metals, e.g. Zn, Cd, Cu, Pb, Hg, Fe, Co, Ni, Cr, Mn, etc., and ammonium radicals such as ammonium, trimethylammonium, methyl-diethylammonium, triethylammonium, tri-ethanolammonium, etc.; and $n$ is an integer equal to the valence of M.

As exemplary of the radicals which come within the scope of the term R, the alkyl radicals may be methyl, ethyl, isopropyl, t-butyl, n-heptyl, 2-ethylhexyl, n-nonyl, etc. or halogen or nitro-substituted alkyl radicals, such as chloromethyl, 2-chloroethyl, 2,3-dichloropropyl, 2-bromoethyl, 2-iodoethyl, 3-fluoropropyl, 2-nitroethyl, 4-nitrobutyl, etc.; the alkenyl radicals may be allyl, butenyl, octenyl, etc. or halogen or nitro substituted alkenyl radicals such as 2-chloroallyl, 2,3-dichloroallyl, 4-bromobutenyl, 3-nitroallyl, 4-nitrobutenyl, etc.; the alkynyl radicals may be propargyl, 3-butynyl, 2-heptynyl, etc.; or halogen or nitro substituted alkynyl radicals such as 2-chloropropargyl, 3-bromopropargyl, 4-chloromethylpropargyl, etc.; and the alkoxyalkyl radicals may be methoxyethyl, ethoxypropyl, ethoxymethyl, propoxypropyl, ethoxyamyl, methoxy-2-ethylhexyl, ethoxyheptyl, vinyloxyethyl, isopropenoxyethyl, allyloxyethyl, 2-butenyloxybutyl, etc.

As illustrative of the compounds which come within the scope of this invention, there may be mentioned:

Sodium-N-methoxyethyl dithiocarbamate
Potassium-N-ethoxypropyl dithiocarbamate
Barium-N-butoxypropyl dithiocarbamate
Zinc-N-ethoxypropyl dithiocarbamate
Cupric-N-methoxyethyl dithiocarbamate
Ammonium-N-methoxyethyl dithiocarbamate
Ammonium-N-methylthioethyl dithiocarbamate
Triethanolammonium-N-methoxyethyl dithiocarbamate
Triethylammonium-N-methoxyethyl dithiocarbamate
Methyldiethylammonium-N-methylthiopropyl dithiocarbamate
Sodium-N-methoxyhexyl dithiocarbamate
Sodium-N-2-ethylhexoxyethyl dithiocarbamate
Sodium-N-n-nonoxyethyl dithiocarbamate
Manganous-N-methoxyethylthioethyl dithiocarbamate
Sodium-N-propoxypropyloxypropyl dithiocarbamate
Sodium-N-ethoxymethylthioethyl dithiocarbamate
Potassium-N-isopropoxy-n-hexylthioethyl dithiocarbamate
Sodium-N-2,2-dimethyl-3-butyloxyethyl dithiocarbamate
Sodium-N-isoamylthiopropyl dithiocarbamate
Sodium-N-isobutyloxyethyl dithiocarbamate
Sodium-N-n-butylthiopropyl dithiocarbamate
Sodium-N-ethylthio-n-amyl dithiocarbamate
Sodium-N-allylthioethyl propyl dithiocarbamate
Ammonium-N-allyloxyethyl dithiocarbamate
Ammonium-N-2-butenyloxyethyl dithiocarbamate
Ammonium-N-propargyloxypropyl dithiocarbamate
Sodium-N-2-chloroallyloxyethyl dithiocarbamate
Sodium-N-2-bromoethyl dithiocarbamate
Cadmium-N-3-chloropropargylthioethyl dithiocarbamate
Nickel-N-methylthioethyl dithiocarbamate Included within the above broad class of compounds is a narrower class of compounds which possess outstanding soil fungicidal and nematocidal activity, the compounds are represented by the following formula:

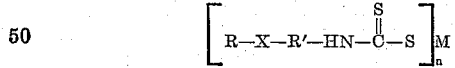

wherein X is oxygen or sulfur, R' is an alkylene radical having from 2 to 3 carbon atoms; R is a straight chain alkyl radical having up to four carbon atoms; M is an alkali metal or an alkaline earth metal and $n$ is an integer equal to the valance of M.

The compounds of this invention are particularly suitable for controlling fungi and parasitic worm life which inhabit agricultural soils. The term "parasitic worm life" as used above and elsewhere in this specification shall be understood to refer to nematodes, trematodes and cestodes which exist in the soil at some stage of their life cycles, for example, egg, larvae, and adult stages and refers particularly to the parasitic worms which inhibit the normal development of plants. The compounds of this invention are adapted conveniently and readily to be distributed in the soil and related growth media. They are advantageously employed in compositions comprising the dithiocarbamic acid salts as essential active ingredients and pesticidal adjuvants, e.g. such as liquid and solid carriers, surface active agents and other additaments.

The distribution of an effective dosage of a dithiocarbamate salt or of a mixture of two or more salts is essential for the practice of this invention. In general, good results are obtained when the dithiocarbamate salt is distributed through the soil in an amount of from about 5 parts to 200 parts or more by weight per million parts by weight of soil. In field applications the compounds of this invention may be applied to the soil at a dosage of from about 0.4 pound to 500 pounds or more per acre, and through such a cross-section of the soil as to provide for the presence therein of an effective concentration of the active ingredient. In broadcast (overall) field applications it is usually preferred to use from about 10 to about 300 pounds per acre. In such applications it is desirable that the active ingredient be distributed to a depth of at least 2 inches below the said surface. It is often desirable to distribute the compounds to a depth of at least 24 inches to avoid reinfestation of the soil from deep-dwelling organisms. In application to the furrow seed row, a surface treatment of at least 0.4 pound per acre is desirable. In the row treatment of existing vegetation, the compounds of this invention may be employed in accordance with known side dressing techniques.

The compounds of this invention, with the exception of the alkaline earth metals and the heavy metal salts are readily soluble in water. Accordingly, it is ordinarily preferred to apply the compounds with an aqueous carrier. However, the present method embraces the employment of both liquid and dust compositions containing the compounds. In such usage, the compounds may be modified with one or more of a plurality of additaments or pesticidal adjuvants including solvents or other liquid carriers, surface active dispersing agents and finely divided inert solids. Depending upon the concentration of the compounds, such augmented compositions are adapted to be distributed in the soil or employed as concentrates and subsequently diluted with additional inert carrier to produce the ultimate treating compositions.

The exact concentration of the compounds to be employed in compositions for the treatment of the soil may vary provided the required dosage of active ingredient is supplied. The concentration of the active ingredient in liquid compositions employed to supply the desired dosage generally is from about 0.001 to 50 percent by weight, although higher concentrations may be employed. In dusts, the concentration of effective agent may vary from about 1 to about 90 percent by weight.

Liquid compositions for practicing this invention may be solutions or dispersions of solids in a liquid carrier. Where the compounds are insoluble or only moderately soluble in water, it is often desirable to employ a water-miscible organic solvent such as an alcohol or a ketone in such aqueous formulations. However, such compound may also be dissolved in an organic liquid such as acetone, methylene chloride, chlorobenzene or petroleum distillates and such organic liquid compositions applied directly to the soil. With aqueous formulations it is sometimes desirable to employ ionic or non-ionic surface active agents.

In addition, aqueous compositions may contain one or more water-immiscible solvents for the compounds. In such compositions, the carrier comprises an aqueous emulsion, i.e. a mixture of a water-immiscible solvent, a surface active agent and water.

The choice of the surface active agent and the amount thereof employed is dictated by the nature of the composition type and by the ability of the agent to facilitate the dispersion of the effective ingredient in the aqueous carrier to produce the desired composition. Surface active agents (commonly referred to as dispersing and/or emulsifying agents) which may be employed in the compositions of this invention include the condensation products of alkylene oxides with phenols and organic acids, alkyl aryl sulfonates, polyoxyethylene derivatives of sorbitan esters, complex ether alcohols, rosin and mahogany soaps, water-soluble salts of long chain carboxylic acids, sulfonated animal, vegetable and mineral oils, and other simple and polymeric compositions having both hydrophilic and hydrophobic functions so as to enable the mixing of otherwise immiscible ingredients. Generally, the surface active agents will be only a minor portion of the formulation as used, for example, less than 15 percent and frequently as low as 0.05 percent by weight of the composition. Usually, concentrations of from 0.5 to 5 percent are found to be optimum.

Suitable solid formulations involve the mixing of the active ingredient with solid diluents which render the compositions dry and free flowing. Thus hygroscopic materials should be avoided. Effective solid diluents are the finely divided carriers, including the clays such as the kaolinites, the bentonites and the attapulgites; other minerals in natural state, such as talc, pyrophyllite, quartz, diatomaceous earth, fuller's earth, chalk, rock phosphate and sulfur; and chemically modified minerals, such as acid-washed bentonites, precipitated calcium phosphates, precipitated calcium carbonate, and colloidal silica. Depending upon the proportion of ingredients, these dust compositions may be employed as concentrates and subsequently diluted with additional solid diluents and/or surface active agents. Also, such concentrate dust compositions may be dispersed in water, with or without the aid of a dispersing agent, to form aqueous soil treating compositions.

When operating in accordance with present invention, the soil or growth media may be impregnated in any convenient manner with the compounds, i.e. by simply mixing the composition with the soil, by applying it to the surface of the soil followed by a dragging or discing operation to disperse it within the soil, or by employing a liquid composition to accomplish the penetration and impregnation. In other methods the compounds are distributed upon the surfaces of the seed furrow, and the furrow is then planted and the soil compacted about the seed and vice versa. Still another method involves dissolving or dispersing the compounds in the water employed to irrigate the soil.

The compounds of this invention may be prepared by reacting the appropriate amine, carbon disulfide and the salt forming agent. This reaction is preferably carried out in an aqueous media, however, suitable solvents such as alcohols, ketones and the like may be employed. Stoichiometric proportions of the reactants are preferred. Generally, temperatures of 30° C. or below are employed in this reaction, with temperatures of 10–20° C. being preferred. Since this is a liquid phase reaction, atmospheric pressures are generally used. The heavy metal salts may be made by first preparing the alkali metal salt of the desired mono-N-substituted dithiocarbamic acid and then reacting the alkali metal salt with a water-soluble heavy metal salt, such as zinc sulfate, cuprous acetate, cadmium acetate, manganous acetate, etc. The organic nitrogen base or ammonium salt derivatives may be prepared in the same manner, i.e. by reacting the sodium mono-N-substituted dithiocarbamate with the appropriate hydrogen chloride salt of the organic nitrogen base; however, they are preferably made by the direct route, i.e. in the $CS_2$ amine reaction.

The present invention is illustrated but not limited by the following examples. Unless otherwise noted all formulations employed in the examples are simple aqueous solutions of the test compounds.

EXAMPLE I

Soil Fungicidal Test

Five ml. aliquots of solutions containing varying amounts of active ingredient (see Table A below) are pipetted into Mason jars containing one pound of soil infested with "damping-off" fungi, principally Pythium, Rhizoctonia and Fusarium species. The jar is sealed and the contents thoroughly mixed by vigorous shaking. The treated soil is incubated at room temperature and 24 hours later it is transferred to 4 inch clay pots. Five seeds of each of the following four crops, (1) beans (Black Valentine), (2) cotton (Delta Pine 15), (3) cucumber (Straight Eight) and (4) pea (Laxton's Progress), are sown in each pot. The seeded pots are incubated at 70° F. and at a high humidity (98% RH) to insure activity of the "damping-off" organisms in the soil. Twenty-four hours later, the pots are removed to the greenhouse and disease assessments are made 10–14 days later. Four replications of each experiment are used to provide a basis for statistical analysis.

The relative value of each compound with respect to its soil fungicidal activity is determined by assessing the percent emergence and disease incidence. It is based on the inoculated, untreated and the uninoculated, sterile soil treatments. The following rating scale is used.

Rating: Healthy plants out of 20
E—Excellent _____ 18–20
P—Promising _____ 15–17
F—Fair _____ 12–14
N—No good _____ 11 or less

TABLE A.—SOIL FUNGICIDAL ACTIVITY

| Compound | Rating at Indicated Level | | |
|---|---|---|---|
| | 50 p.p.m. | 25 p.p.m. | 13 p.p.m. |
| 1. Sodium-N-methoxyethyl dithiocarbamate | P | P | F |
| 2. Sodium-N-ethoxyethyl dithiocarbamate | P | P | P |
| 3. Sodium-N-methoxypropyl dithiocarbamate | P | P | N |
| 4. Sodium-N-ethoxypropyl dithiocarbamate | E | P | N |
| 5. Sodium-N-isopropyloxypropyl dithiocarbamate | P | P | N |
| 6. Sodium-N-butoxypropyl dithiocarbamate | P | P | P |
| 7. Sodium-N-ethylthioethyl dithiocarbamate | E | E | E |
| 8. Sodium-N-decyloxypropyl dithiocarbamate | N | N | N |
| 9. Sodium-bis(2-methoxyethyl) dithiocarbamate | N | N | N |
| 10. Sodium-N-methoxymethyl dithiocarbamate | N | N | N |
| 11. Sodium-N-methoxypropyl thiolcarbamate | N | N | N |
| 12. Sodium-N-methoxyethyl thiolcarbamate | N | N | N |

Similar results are obtained (i.e. similar to those obtained with compounds 1–7) when the following dithiocarbamates are tested as above:

Potassium-N-methylthioethyl dithiocarbamate
Nickel-N-ethoxyethyl dithiocarbamate [1]
Barium-N-ethoxyethyl dithiocarbamate [1]
Ammonium-N-butoxypropyl dithiocarbamate
Methyldiethyl ammonium-N-ethylthiopropyl dithiocarbamate
Triethanolammonium-N-butoxypropyl dithiocarbamate
Calcium-N-ethoxyethyl dithiocarbamate [1]
Triethylammonium-N-ethoxyethyl dithiocarbamate

[1] A dust formulation (Attaclay) is used with these compounds.

EXAMPLE II

Agar Plate Dilution Assay

In this example a comparison was made of the fungicidal activity of sodium-N-methoxyethyl dithiocarbamate with sodium-N-methyl dithiocarbamate. Agar plates, containing the test organisms indicated in Table B below were treated with the indicated amounts of the test compounds ($H^2O$ solutions of the dithiocarbamate salt). Results are determined by measuring the diameter (millimeters) of the colonies at 3, 4, and 5 day intervals after inoculation.

TABLE B

| Compound | Conc., p.p.m. | Verticillium | | | Fusarium | | | Sclerotium | | | Rhizoctonia | | |
|---|---|---|---|---|---|---|---|---|---|---|---|---|---|
| | | 3 | 4 | 5 | 3 | 4 | 5 | 3 | 4 | 5 | 3 | 4 | 5 |
| Control | | 18 | 30 | 54 | 14 | 26 | 39 | 46 | 57 | 76 | 35 | 54 | 70 |
| Sodium-N-methyl-dithiocarbamate | 40 | 11 | 23 | 30 | 11 | 21 | 28 | 14 | 27 | 38 | 20 | 34 | 51 |
| | 30 | 13 | 23 | 38 | 14 | 21 | 30 | 18 | 30 | 45 | 23 | 38 | 55 |
| | 20 | 21 | 23 | 58 | 21 | 34 | 47 | 27 | 35 | 56 | 23 | 39 | 55 |
| Sodium-N-methoxy-ethyl-dithiocarbamate | 40 | 6 | 15 | 26 | 0 | 0 | 0 | 0 | 0 | 0 | 0 | 0 | 0 |
| | 30 | 12 | 23 | 33 | 0 | 0 | 6 | 0 | 0 | 0 | 0 | 0 | 0 |
| | 20 | 18 | 28 | 45 | 0 | 4 | 11 | 26 | 0 | 0 | 17 | 0 | 4 | 9 |

The above data effectively demonstrates that sodium-N-methoxyethyl dithiocarbamate is more active, has a wider spectrum of activity and has a longer residual activity than sodium-N-methyl dithiocarbamate.

EXAMPLE III

Nematocidal Activity—Primary Test

In evaluating the nematocidal activity of the mono-N-substituted dithiocarbamates of this invention, aqueous nematode cultures are used. Aqueous test solutions of the compounds being evaluated are added to a culture containing a substantial number of the nematode, *Panagrellus redivivus*. The nematocidal effect is determined by observing through a stereoscope-microscope (magnification 10× or 12×) and recording the rate of flexing of the nematode's body at timed intervals. The data given below are based on the 24 hour observation. It is known that a nematode dispersed in water flexes its body at a constant rate and under the influence of nematocides the rate of flexing gradually decreases until it disappears entirely, at which point the nematode is dead. The motility observed at the 24 hour interval is set forth in Table C below for 2 different concentrations of the test compound.

TABLE C
[24 hour data]

| Compound | Motility at Concentration | |
|---|---|---|
| | 0.1% | 0.01% |
| Control | 100 | 100 |
| 1. Sodium-N-methoxyethyl dithiocarbamate | 0 | 10 |
| 2. Sodium-N-ethoxyethyl dithiocarbamate | 0 | 50 |
| 3. Sodium-N-ethoxypropyl dithiocarbamate | 0 | 50 |
| 4. Sodium-N-isopropoxypropyl dithiocarbamate | 0 | 75 |
| 5. Sodium-N-butoxypropyl dithiocarbamate | 0 | 50 |
| 6. Sodium-N-methoxypropyl dithiocarbamate | 0 | |
| 7. Sodium-N-decyloxypropyl dithiocarbamate | 100 | |

Similar results are obtained when the following dithiocarbamates are tested as above:

Potassium-N-methylthioethyl dithiocarbamate
Nickel-N-ethoxyethyl dithiocarbamate [1]
Ammonium-N-butoxypropyl dithiocarbamate
Triethanolammonium-N-butoxypropyl dithiocarbamate
Methyldiethylammonium-N-ethylthiopropyl dithiocarbamate
Triethylammonium-N-ethoxyethyl dithiocarbamate

[1] Tween 20, a surface active dispersing agent, is used to obtain a test solution of this compound.

EXAMPLE IV

*Nematocidal Activity—Secondary Test*

The test organism for this greenhouse screening method, root knot nematode (Meloidogyne spp.) is maintained and cultured on the roots of potted tomato plants. Infectious inoculum is prepared by grinding the washed roots of infected plants in a Waring Blendor with water, two grams of infected root to 100 mls. of water yielding a satisfactory inoculum.

Five hundred grams of sterilized soil are weighted into ice cream cartons and 25 mls. of infectious inoculum are added to the carton and mixed with the soil. Sufficient additional water is added to bring the potting soil to approximately 50% of field capacity.

Twenty-five mls. of a 2% solution of the test compound are added to one carton of soil as a drench and 25 mls. of a 0.2% solution of the test compound are added to the second carton. This treatment gives a concentration of chemical in the soil of 0.1% and 0.01% respectively. The cartons are capped and allowed to stand for one week, at the end of which time a two week old Marglobe tomato plant is transplanted into each carton. Untreated control cartons are also planted.

After a growing period of two months, the tomato plants are harvested and the roots washed and examined for evidence of infection. The treated plants are compared to untreated controls in order to estimate the phytotoxicity of the chemical. The infected roots are graded and recorded as an index of infection as follows:

INDEX

1—No infection
2—Infection, barely recognized
3—Light infection
4—Medium infection
5—Heavy infection

| Compound | Index at Concentration | | Phytotoxicity, 0.1% |
|---|---|---|---|
| | 0.1% | 0.01% | |
| Sodium-N-methoxyethyl dithiocarbamate | 2 | 1 | Slight. |

Similar results are obtained when the following dithiocarbamates are tested as above:

Potassium-N-ethyl dithiocarbamate
Nickel-N-ethoxyethyl dithiocarbamate [1]
Barium-N-ethoxyethyl dithiocarbamate
Ammonium-N-butoxypropyl dithiocarbamate
Triethanolammonium-N-butoxypropyl dithiocarbamate
Zinc-N-ethoxyethyl dithiocarbamate [1]
Triethylammonium-N-ethoxyethyl dithiocarbamate By following the procedures described in the examples it will be found that other mono-N-oxahydrocarbon- and N-thiahydrocarbon substituted dithiocarbamate salts are likewise effective against common phytopathogenic organisms, such as *Rhizoctonia solani, Fusarium solania, Pythium ultimum,* Meloidogyne, spp. and the like.

The compounds of this invention may be used as the sole active ingredient or they may be used in conjunction with other pest control agents, e.g. insecticides, fungicides, nematocides, bactericides, etc.

Although the majority of the compounds of this invention are soluble in water, it is frequently advantageous to include a surface active agent in most formulations, including aqueous formulations. Liquid formulations of the water insoluble types, e.g. the heavy metals and alkaline earth metal derivatives, usually contain surface active agents of the dispersing type or the emulsifying type, depending upon whether they are formulated as dispersible concentrates or as emulsifiable concentrates. Solid formulations of all the compounds contemplated desirably contain a surface active agent.

A typical dust can be made from five parts of one of the above compounds, e.g. sodium-N-ethoxyethyl dithiocarbamate, one part of condensed naphthalene sodium sulfonate dispersant, 84 parts of kaolin and 10 parts of diatomaceous earth.

A typical wettable powder formulation, which can be extended with water and applied in a spray, is 25 parts of sodium-N-ethylthioethyl dithiocarbamate, 70 parts of Attaclay, 2 parts of the sodium salt of lignin sulfonic acid (goulac) and three parts of an octyl phenoxypolyethoxyethanol wetting agent.

Emulsifiable concentrates may be prepared by dissolving one or more compounds of this invention in a suitable organic solvent, described heretofore, and adding thereto a suitable emulsifying agent, e.g. ethylene oxide reaction products with alkylphenols, long chained mercaptans, higher alcohols, long chained carboxylic acids or other surface active agents which have been described above in detail.

A typical formulation is as follows: 20 parts of nickel-N-ethoxyethyl dithiocarbamate, 5 parts of a t-dodecyl mercaptan-ethylene oxide condensate, and 75 parts of xylene. Three parts of sodium dodecyl benzene sulfonate may be used in place of three parts of the ethylene oxide condensate in the above formulation.

An aqueous concentrate may be prepared by mixing 50 parts of one of the above compounds and 10 parts of a surface active agent, e.g. an alkylated aryl polyether alcohol or polyoxyethylene sorbitan monolaurate, with 50 parts of water.

These concentrate compositions, i.e. wettable powder compositions, emulsifiable concentrate compositions and aqueous concentrate compositions, may be dispersed in water to prepare aqueous compositions which have very desirable wetting and penetrating properties.

Both the solid and the liquid formulations above described are useful in the application of the pesticidal agents of this invention, because they facilitate the uniform distribution and aid in the control of the phytopathogenic soil-borne organisms by maintaining the active ingredient in a form which enables its prompt assimilation by the organism and the efficient utilization of its biocidal properties. The described pesticidal adjuvants enable the proper use of the compounds to achieve the desired pesticidal effect by an unskilled operator without the use of elaborate equipment.

The phrase "applying to the soil" as used herein in the specification and claims shall be understood to refer to any method of applying the pesticidal agents to the soil for control of the phytopathogenic organisms therein, and includes spraying a cultivated field, injecting a liquid formulation in a furrow by means of a suitable jet following a plow or harrowing device, dusting the field with a solid formulation before the field is plowed or any other suitable means whereby substantial uniform distribution of the pesticidal agents can be effected.

The expressions "growth media" or "soil" are employed in the present specification and claims in their broadest sense to be inclusive of all conventional "soils," as defined by Webster's New International Dictionary, second edition unabridged, published in 1937 by G. and C. Merriam Company, Springfield, Mass. Thus these terms refer to any substances or media in which vegetation may take root and grow and are intended to include not only earth but also compost, manure, muck, humus, sand and the like, which are adapted to support plant growth.

While this invention has been described with respect to certain embodiments, it is not so limited, and it is to be understood that variations and modifications thereof obvious to those skilled in the art may be made without departing from the spirit of this invention.

This application is a continuation-in-part of applica-

---

[1] Tween 20, a surface active dispersing agent, is used to obtain a test solution of these compounds.

tion Serial Number 765,955, filed October 8, 1958, now abandoned.

What is claimed is:

1. A method which comprises applying to the soil from about 0.4 to about 500 pounds per acre of a compound of the structure,

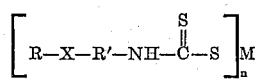

wherein X is selected from the group consitsing of oxygen and sulfur, R' is an alkylene radical having from 2 to 6 carbon atoms, R is selected from the group consisting of alkyl, alkenyl, alkynyl, and alkoxyalkyl radicals having up to 9 carbon atoms, M is selected from the group consisting of alkali metals, alkaline earth metals, heavy metals, and ammonium radicals, and $n$ is an integer equal to the valence of M.

2. A method which comprises applying to the soil from about 10 to about 300 pounds per acre of a compound of the structure,

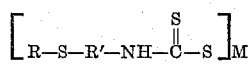

wherein R' is an alkylene radical having from 2 to 3 carbon atoms, R is a straight-chain alkyl radical having up to 4 carbon atoms, and M is an alkali metal.

3. A method of claim 2 wherein the compound is sodium N-ethylthioethyl dithiocarbamate.

4. A method which comprises applying to the soil from about 10 to about 300 pounds per acre of a compound of the structure,

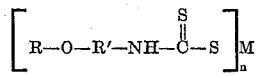

wherein R' is an alkylene radical having from 2 to 3 carbon atoms, R is a straight-chain alkyl radical having up to 4 carbon atoms, M is an alkaline earth metal, and $n$ is an integer equal to the valence of M.

5. A method which comprises applying to the soil from about 10 to about 300 pounds per acre of a compound of the structure,

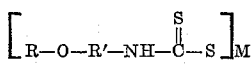

wherein R' is an alkylene radical having from 2 to 3 carbon atoms, R is a straight-chain alkyl radical having up to 4 carbon atoms, and M is an alkali metal.

6. A method of claim 5 wherein the compound is sodium N-ethoxyethyl dithiocarbamate.

7. A method of claim 5 wherein the compound is sodium N-butoxypropyl dithiocarbamate.

8. A method of claim 5 wherein the compound is sodium N-methoxyethyl dithiocarbamate.

9. A pesticidal composition which comprises a pesticidal adjuvant and, as an essential active ingredient, a compound of the structure,

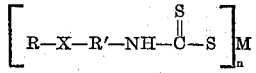

wherein X is selected from the group consisting of oxygen and sulfur, R' is an alkylene radical having from 2 to 6 carbon atoms, R is selected from the group consisting of alkyl, alkenyl, alkynyl, and alkoxyalkyl radicals having up to 9 carbon atoms, M is selected from the group consisting of alkali metals, alkaline earth metals, heavy metals, and ammonium radicals, and $n$ is an integer equal to the valence of M.

10. A composition of claim 9 wherein a pesticidal adjuvant is a surface-active agent.

11. A composition of claim 10 wherein an essential active ingredient is sodium N-ethylthioethyl dithiocarbamate.

12. A pesticidal composition which comprises a pesticidal adjuvant and, as an essential active ingredient, a compound of the structure,

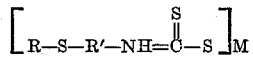

wherein R' is an alkylene radical having from 2 to 3 carbon atoms, R is a straight-chain alkyl radical having up to 4 carbon atoms, and M is an alkali metal.

13. A pesticidal composition which comprises a pesticidal adjuvant and, as an essential active ingredient, a compound of the structure,

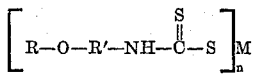

wherein R' is an alkylene radical having from 2 to 3 carbon atoms, R is a straight-chain alkyl radical having up to 4 carbon atoms, M is an alkaline earth metal and $n$ is an integer equal to the valence of M.

14. A pesticidal composition which comprises a pesticidal adjuvant and, as an essential active ingredient, a compound of the structure,

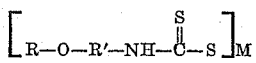

wherein R' is an alkylene radical having from 2 to 3 carbon atoms, R is a straight-chain alkyl radical having up to 4 carbon atoms, and M is an alkali metal.

15. A composition of claim 14 wherein a pesticidal adjuvant is a surface-active agent.

16. A composition of claim 15 wherein an essential active ingredient is sodium N-ethoxyethyl dithiocarbamate.

17. A composition of claim 15 wherein an essential active ingredient is sodium N-butoxypropyl dithiocarbamate.

18. A composition of claim 15 wherein an essential active ingredient is sodium N-methoxyethyl dithiocarbamate.

References Cited in the file of this patent

UNITED STATES PATENTS

| Re. 22,750 | Tisdale | Apr. 30, 1946 |
| 2,677,698 | Deutschman | May 4, 1954 |
| 2,854,467 | Harman | Sept. 30, 1958 |
| 2,905,586 | Harman | Sept. 22, 1959 |

FOREIGN PATENTS

| 233,721 | Switzerland | Nov. 16, 1944 |